United States Patent Office 3,519,583
Patented July 7, 1970

3,519,583
AQUEOUS EMULSION ELECTROCOATING
COMPOSITION
Olin W. Huggard, Rocky River, Ohio, assignor to Mobil
Oil Corporation, a corporation of New York
No Drawing. Filed Nov. 13, 1967, Ser. No. 682,636
Int. Cl. C08g 17/16; C09d 3/66, 5/24
U.S. Cl. 260—21                                    10 Claims

ABSTRACT OF THE DISCLOSURE

Aqueous emulsions particularly adapted for electrophoretic deposition are provided with the discontinuous oil phase of the emulsion comprising normally liquid unsaturated oil modified by reaction with unsaturated acid to enable dispersion with a polycarboxylic acid emulsifying agent, the properties of the system being improved through the presence in the modified oil of more than 20% of a nonwater-soluble, water dispersible aminoplast resin. Typical modification of the oil is by adduction with maleic or fumaric acid to provide an acid number of from 5–30 which is insufficient for water solubilization. In this way, organic solvents can be omitted from the oil phase. Methyl ethyl ketone is dissolved in the aqueous phase of the emulsion to improve the throwing power of the system.

---

The present invention relates to aqueous emulsion compositions especially adapted to deposit coatings by electrophoretic deposition, e.g., a process in which a unidirectional electrical current is passed through the composition to cause deposition of a paint film at the anode of the system. As is well known, it is highly desirable in electrophoretic deposition to provide high throwing power as well as good flow of the deposited film on the base. It is also desirable in some instances to eliminate water immiscible organic solvents from the oil phase of the emulsion. The present invention is especially directed to the achievement of high throwing power in the emulsion electrophoretic deposition system and to the achievement of good flow in the absence of water immiscible organic solvents in the oil phase of the emulsion.

In accordance with the invention, the discontinuous oil phase of an aqueous emulsion system is constituted by a low molecular weight oil soluble resin, adequate flow being obtained as a result of the low molecular weight of the resin. In order to obtain reasonable film properties through cure a large proportion, e.g., in excess of 20%, based on the weight of the oil soluble resin, of a low molecular weight non-water-soluble, water dispersible formaldehyde condensate is cold blended with the oil phase resin to enable the desired film properties to be obtained upon cure. With the oil phase of the emulsion system being formulated as indicated above, the aqueous phase of the emulsion can have dispersed therein a polycarboxylic resin which serves as an emulsifying agent for the oil phase resin and which serves to cause the emulsion particles to be deposited at the anode together with the polycarboxylic acid emulsifying agent, it being understood that water dispersibility and emulsifying activity is achieved by the polycarboxylic acid resin in conjunction with ammonia or an amine which forms a salt or soap with the acid groups of the emulsifying agent.

In addition to the foregoing, water miscible organic solvents are selected with care for incorporation in the aqueous phase of the emulsion, appropriate selection of these solvents further assisting the high throwing power which is desired.

Referring first to the oil soluble resin, these, in accordance with the invention, are unsaturated oils which have been adducted with an unsaturated acid to provide a low molecular weight normally liquid adduct of low acid number sufficient to permit emulsification in water, but insufficient to permit solubilization in water with ammonia or an amine. Acid numbers less than 30, preferably less than 25 effectively avoid water solubilization, and acid numbers of at least 5, preferably at least 10 are sufficient to enable emulsification using a film-forming emulsifying agent in the water phase.

Referring more particularly to the unsaturated oil, any unsaturated oil may be used in accordance with the invention. It is preferred to employ oils which are triglycerides of unsaturated fatty acids, but unsaturated fatty acid esters of other aliphatic polyols such as tall oil ester of pentaerythritol or trimethylol propane may be used. Preferred oils are dehydrated castor oil, soya oil, linseed oil, tung oil, oiticica oil, or safflower oil. The oil may be bodied if desired or modified slightly as by cooking with ester gum so long as excessive bodying is avoided. The point is to maintain a sufficiently low viscosity as to permit good flow in the absence of added organic solvent.

Any aliphatic alpha,beta-unsaturated carboxylic acid may be used in accordance with the invention. The preferred acids are monoethylenically unsaturated and dicarboxylic. The presently preferred acid is fumaric acid, but maleic acid is also good. Other acids from the class already defined, such as crotonic acid, acrylic acid and sorbic acid may be used. The term "acid" is intended to broadly include the acid in the form of its anhydride, e.g., maleic anhydride may be used, though the presence of anhydride groups in the final product is not preferred and is desirably avoided. Thus, and to obtain best results, the anhydride groups are preferably eliminated from the product as by hydrolysis and/or by esterification or the acid is used in the form of free acid, preferably fumaric acid, and reaction conditions are selected to substantially preclude the elimination of water during the formation and bodying of the oil-acid adduct and the consequent formation of the less desired anhydride group.

The elimination of the anhydride moiety is of greater importance in connection with the water phase resin and will be more fully discussed in connection therewith.

The proportion of unsaturated acid which is adducted with the unsaturated oil should be such as to provide the low acid numbers discussed hereinbefore, but typically the oil soluble resin contains from 2–6% by weight of unsaturated acid.

The formaldehyde condensate is a water dispersible aminoplast resin which is preferably a melamine-formaldehyde condensate which is not soluble in water and which is of sufficiently low molecular weight as to be liquid at 100% solids. The term "aminoplast" is used to identify heat-hardening condensates with a polyamine such as urea, melamine and like compounds. The absence of water solubility is important to the stability of the system since it is not desirable to have the formaldehyde condensate and the polycarboxylic water phase resin present in the aqueous phase in admixture with one another since this might lead to premature reaction between the carboxyl groups of the water phase resin and the methylol groups of the aminoplast. While this reaction is not rapid at room temperature, it is to be noted that an electropainting bath must be stable for long periods of time despite the fact that there is extensive agitation, oxygen in the system, and heat generated by the electrophoretic deposition.

In order to satisfy the above requirements, the formaldehyde condensate should be of minimum molecular weight as illustrated by hexamethylol melamine or some other polymethylol melamine containing at least four methylol groups per molecule. While hexamethylol melamines and similar products are water soluble, especially when they are provided in the form of ethers with low molecular weight alcohols, such as methanol or ethanol, alcohol selection can be used to minimize water solubility despite the low molecular weight of the condensate. Thus, by utilizing a proportion of isopropanol, propanol, butanol or higher boiling alcohol in the alcoholic medium used for etherification, the capacity of the condensate to dissolve in water can be substantially eliminated even though the molecular weight is very low as evidenced by the fluidity of the liquid condensate at room temperature at 100% solids.

As previously indicated, the aminoplast resin is placed in the discontinuous oil phase of the emulsion by incorporating it with the oil soluble resin in an amount in excess of 20% by weight, based on the weight of the oil soluble resin. For this purpose, the aminoplast resin and the oil soluble resin are premixed prior to dispersion in the emulsion, it being permissible for the water soluble resin to be present in the same admixture. Cold mixing is adequate to combine the aminoplast resin and the oil soluble resin, any water soluble resin being leached from the mixture into the aqueous continuum of the emulsion. While hot blending can be tolerated to some extent, it is preferably avoided because there is some tendency toward gelation, or at least undesirable thickening, it being kept in mind that low viscosity of the mixture of oil soluble resin and aminoplast resin is desired to enable good flow in the absence of added organic solvent.

Preferred proportions for the aminoplast resin in the oil soluble resin are at least 30% on the weight basis noted. On the other hand, amounts in excess of 100% are not preferred since then it is difficult to couple the transport and deposition of the aminoplast with the transport and deposition of the oil soluble resin.

The continuous aqueous phase contains dissolved salt, preferably volatile nitrogenous base salt with the resinous film forming polycarboxylic acid emulsifying agent. This polycarboxylic resin is illustrated by a heat-reaction product provided by heat-reacting aliphatic alpha,beta-ethylenically unsaturated carboxylic acid with polyester of unsaturated fatty acid and aliphatic polyhydric alcohol, the heat-reaction product having an acid number of at least 40, preferably at least 80. The polyester is usually an unsaturated triglyceride oil.

The unsaturated oils which are used here are the same as those described hereinbefore, but the acidity of the adduct with the unsaturated acid is much higher, enabling the oily materials to be essentially dissolved in water with the aid of a base and to function as emulsifying agents for the mixture of oil phase resins.

Similarly, the same unsaturated carboxylic acid noted hereinbefore can be used, but now it is of greater importance to eliminate any anhydride groups which may be present in the adduct.

Anhydrides, and particularly maleic anhydride, can be used with considerable effectiveness if the final product is blown with steam or reacted with water for several hours in order to eliminate substantially all of the anhydride groups by converting the same to a pair of carboxylic acid groups.

It is of interest to note that when acid value is determined by titration with alcoholic potassium hydroxide, that one molecule of potassium hydroxide is consumed per anhydride molecule. On the other hand, when titration is effected with aqueous potassium hydroxide, then each anhydride group is capable of functioning as though it were a pair of carboxyl groups so that the acid value for a resin containing anhydride groups is always higher when titration is with aqueous potassium hydroxide than it is when titration is with alcoholic potassium hydroxide.

Titration in alcoholic potassium hydroxide and aqueous potassium hydroxide should provide acid values not more than 5 acid number units apart which is indicative of the substantial absence of the anhydride group.

The adducts which are intended to be essentially dissolved in water (which normally includes coupling solvent) using a base, preferably ammonia or an amine, are desirably bodied so long as the viscosity which is achieved does not interfere with water solubility. This bodying operation may include copolymerization with minor amounts of vinyl unsaturated monomers such as styrene and like monomers including acidic monomers such as acrylic acid in order to provide increased body for the adduct. Other techniques for bodying the oil are also well known, including cyclopentadiene modification of the oil.

The adduction reaction between the unsaturated oil and the unsaturated acid is old and well known, it being merely necessary to cook the oil into the acid as by heating the two at an appropriately elevated temperature.

Viscosity can be built up in numerous ways, and efforts to build viscosity may precede, accompany or follow adduct formation. In preferred practice, the final adduct which is used has a viscosity measured at 220° F. at 100% solids of at least T, preferably at least V, on the Gardner scale, and is substantially devoid of anhydride groups.

The specific nature of the volatile nitrogenous base which is preferred is not a primary feature of the invention. In selecting the volatile base, the base is desirably of sufficient volatility to vaporize so that at least a large portion of the base will leave the film which is deposited during the operation of drying the film. Ammonia is a particularly preferred nitrogenous base because of its low cost. Other volatile bases such as volatile aliphatic amines are more costly, but provide excellent results. Non-volatile bases may, less desirably, be used such as sodium and potassium which may be employed in the form of hydroxides or alkaline salts such as carbonates.

The proportion of base which is used is of secondary significance. Broadly, enough base is used to dissolve the heat-reaction product.

The oil-acid heat-reaction product is simply dissolved in water containing the selected base, preferably ammonia or a volatile aliphatic amine to provide the aqueous phase of the desired emulsion.

The water phase resin is preferably used together with a water miscible organic solvent, numerous of these being known and being broadly identified by the term "coupling solvent." In the present invention, the utilization of methyl ethyl ketone is of especial value in emphasizing the high throwing power of the system, though the more common water miscible coupling solvents such as 2-ethoxy ethanol and the like are also useful.

As will be evident to those skilled in electropainting, an aqueous electropainting bath is formulated to contain from about 4 to about 20% by weight of resin solids and is pigmented in conventional fashion. The object to be coated, usually a metal object, is immersed in the bath and a unidirectional electrical current is passed through the bath and through the object to be coated as the anode of the electrical system. When the coating operation is completed, the object is withdrawn from the bath, normally rinsed with water, and then baked to remove residual water as well as any solvents or alkaline materials which may remain in the film to the extent that these are volatile.

The alkaline material which is used to dissolve the water phase resin is normally used in an amount to provide a pH of at least about 6 and preferably higher. In preferred practice, the pH of the bath is somewhat in excess of pH 7.5 and is most preferably considerably higher, e.g., in the range of pH 9 to pH 10.

The invention will be illustrated in the examples which follow.

EXAMPLE 1

An oil soluble resin for use in the invention is prepared as follows.

Load #1: 190 pounds alkali refined linseed oil, 190 pounds dehydrated castor oil
Load #2: 44 pounds ester gum
Load #3: 16 pounds fumaric acid Heat Load #1 to 310° F. in 1½ hours with an inert gas blanket of 1.0 c.f.m. Add Load #2 and heat to 450° F. in ¾ hour. Hold at 450° F. for 1 hour and then add Load #3. Slowly raise the temperature to 500° F. if necessary to obtain a final viscosity of R at 100% nonvolatile solids and an acid number of 19.

The product has the following final characteristics:

Solids—100%
Viscosity (Gardner-Holdt)—R
Acid Number—19
Color—7–8
Weight/gallon—8.02 pounds

EXAMPLE 2

A resin dispersible in water with the aid of a base for use in the invention is prepared as follows.

2064 pounds of cyclopentadiene-modified linseed oil are admixed with 2064 pounds of dehydrated castor oil and heated to 450° F. in 2 hours while under a nitrogen blanket. The mixture is held at 450° F. for 1 hour, there being no viscosity increase during this period. The mixture is then cooled to 230° F. over a period of 90 minutes and 563 pounds of maleic anhydride are added whereupon the temperature is raised to the range of 380° F. in 1 hour. Cooling is used as needed to control the exotherm and the temperature is maintained at 380–420° F. for from 1–3 hours until the final Gardner-Holdt viscosity of U is reached, the viscosity being measured at 77° F. in a 70% solution in mineral spirits. The product is cooled to 220° F. in 2¼ hours. The acid number (alcoholic KOH) is about 71.

The mixture is then placed under total reflux and 65 pounds of water are added to the bottom of the kettle over a period of 45 minutes. The heat is increased gradually over 1¼ hours to a temperature of 280° F. which is held for 1 hour until the acid value (alcoholic KOH) is in the range of 100–104 whereas the acid value measured in aqueous KOH is less than 5 units higher. Any unreacted water is then removed by vacuum or sparging. The Gardner-Holdt viscosity at 70% N.V. in mineral spirits should be Z–1—Z–3. The resin so-provided is then reduced by dropping the same into 866 pounds of methyl ethyl ketone and filtered to provide a yield of 681 gallons at 84.5% non-volatile solids.

The product has the following final characteristics:

Non-volatile solids—84.5%
Solvent—100.0% methyl ethyl ketone
Viscosity—Z–1—Z–3
Acid number—100–104 (alcoholic KOH), 105–109 (aqueous KOH)
Color—9–11
Weight/gallon—8.20 pounds

EXAMPLE 3

An aqueous emulsion composition adapted to deposit coatings by electropainting in accordance with the invention is prepared from the following components.

| Non-volatile resin: | Percent of total resin system |
|---|---|
| Oil soluble product of Example 1 | 38 |
| Nonwater soluble water dispersible modification of hexamethoxy methyl melamine [1] | 15 |
| Water dispersible product of Example 2 | 47 |

[1] (Partially isopropylated until water solubility is substantially eliminated) Gardner-Holdt viscosity U–W.

The components are added in the order listed, and the solution is thoroughly mixed after each component is added.

| Component: | Gallons |
|---|---|
| Resin of Example 2 | 17.77 |
| Methyl ethyl ketone | 5.02 |
| Diethylene glycol monoethyl ether | 0.39 |
| Nonwater soluble water dispersible modification of hexamethoxy methyl melamine | 5.04 |
| Diethyl amine | 2.14 |
| Oil soluble resin of Example 1 | 14.10 |
| Iron naphthenate drier (6% solution) | 0.13 |

After the foregoing components are added and thoroughly mixed, 29.75 gallons of water are added under agitation. 12.21 gallons of a pigmented paste (prepared as indicated below) are then added under agitation. When the mixing is completed, 12.98 gallons of water and 0.47 gallon of diethyl amine are added to provide a final emulsion containing 43.4% solids.

The pigmented paste utilized is prepared as follows:

2.55 gallons of the water dispersible product of Example 2 (varied to use 2-ethoxy ethanol instead of methyl ethyl ketone) are premixed with 0.47 gallon of additional 2-ethoxyethanol, 0.37 gallon of diethyl amine and 6.22 gallons of water. This premixed solution is placed in a pebble mill and has added thereto 17.80 pounds of carbon black, 32.50 pounds of basic lead silicate (micronized grade) and 28.20 pounds of barium sulphate. This mixture is milled in a cold pebble mill to provide 12.21 gallons of paste having a Hegman grind rating of 7¼ N.S.

EXAMPLE 4

The emulsion described in Example 3 is reduced with 3 volumes of deionized water to provide an electrocoating bath having a pH in the range of 9.4–9.6. The diluted emulsion deposits films electrophoretically on any metallic or other conductive anode immersed therein when a unidirectional electrical current is applied in conventional fashion as is known in the art. These films cure to provide good physical and chemical properties upon being baked for 30 minutes in an oven having a temperature of 350° F.

The invention is not to be construed by any abstract of disclosure, but its features are instead characterized in the description given hereinbefore and is defined in the claims which follow.

I claim:

1. An aqueous emulsion composition adapted to deposit coatings by electrophoretic deposition comprising a continuous aqueous phase having dispersed therein an emulsifying agent consisting essentially of a salt of a base with a resinous film forming polycarboxylic acid substantially free of anhydride groups and an oil soluble phase stably dispersed in said aqueous phase by means of said emulsifying agent, said oil soluble phase being substantially free of water immiscible organic solvent and comprising dispersed particles of oil soluble resin constituted by normally liquid unsaturated fatty acid ester oil modified by reaction with aliphatic alpha, beta-unsaturated carboxylic acid to an acid number of 5–30, said oil soluble resin containing in excess of 20% based on the weight thereof of non water-soluble, water dispersible, normally liquid aminoplast resin.

2. An aqueous emulsion as recited in claim 1 in which said aminoplast resin is hexamethylol melamine etherified to minimize water solubility.

3. An aqueous emulsion as recited in claim 1 in which said aminoplast resin is used in an amount of at least 30%, based on the weight of said oil soluble resin.

4. An aqueous emulsion as recited in claim 1 in which said unsaturated oil is modified by reaction with a monoethylenically unsaturated dicarboxylic acid in an amount of from 2–6%, based on the weight of the oil soluble resin.

5. An aqueous emulsion as recited in claim 1 in which said base is a volatile nitrogenous base.

6. An aqueous emulsion as recited in claim 1 in which said oil soluble resin and said aminoplast resin are cold blended prior to dispersion in said continuous aqueous phase.

7. An aqueous emulsion as recited in claim 1 in which said resinous film forming polycarboxylic acid is a heat reaction product of aliphatic alpha,beta-ethylenically unsaturated carboxylic acid with polyester of unsaturated fatty acid and aliphatic polyhydric alcohol having an acid number of at least 40 and substantially free of anhydride groups.

8. An aqueous emulsion as recited in claim 1 in which said continuous aqueous phase has dissolved therein methyl ethyl ketone.

9. An aqueous emulsion as recited in claim 1 in which said emulsion contains from 4.20% by weight of resin solids and has a pH in excess of pH 7.5.

10. A method of coating a body capable of carrying an electrical current with a uniform weather resistant coating comprising immersing said body in tthe aqueous emulsion recited in claim 1, passing a unidirectional electrical current through said aqueous emulsion and through said body as anode to deposit a uniform water-insoluble film thereupon, and making said film to cure the same.

References Cited

UNITED STATES PATENTS

| | | | |
|---|---|---|---|
| 3,112,218 | 11/1963 | Spiller | 260—21 |
| 3,133,032 | 5/1964 | Jen et al. | 260—21 |
| 3,152,095 | 10/1964 | Tropp et al. | 260—21 |
| 3,297,557 | 1/1967 | Huggard | 204—181 |
| 3,340,172 | 9/1967 | Huggard | 204—181 |
| 3,383,342 | 5/1968 | Stephens | 260—21 |
| 3,394,093 | 7/1968 | Salem | 260—21 |

DONALD E. CZAJA, Primary Examiner

R. W. GRIFFIN, Assistant Examiner

U.S. Cl. X.R.

117—132 134, 161, 167; 204—181; 260—22, 29.3, 32.4, 32.6, 32.8, 33.2, 39, 40

PO-1050
(5/69)

UNITED STATES PATENT OFFICE
CERTIFICATE OF CORRECTION

Patent No. 3,519,583  Dated July 7, 1970

Inventor(s) Olin W. Huggard

It is certified that error appears in the above-identified patent and that said Letters Patent are hereby corrected as shown below:

Column 7, line 18 (claim 9) "4.20%" should be read as --4-20%--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents